(12) United States Patent
Michalowski et al.

(10) Patent No.: US 8,175,947 B2
(45) Date of Patent: May 8, 2012

(54) SYSTEM AND METHOD FOR ADMINISTERING FIXED INDEX ANNUITIES

(75) Inventors: Philip W. Michalowski, Glastonbury, CT (US); Keith E. Golembiewski, Suffield, CT (US); Joseph M. Weiss, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 999 days.

(21) Appl. No.: 12/123,632

(22) Filed: May 20, 2008

(65) Prior Publication Data
US 2009/0292562 A1 Nov. 26, 2009

(51) Int. Cl.
G06Q 40/00 (2012.01)
(52) U.S. Cl. .............................. 705/36 R; 705/35; 705/4
(58) Field of Classification Search ................ 705/4, 35, 705/36 R
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,611,808 B1 | 8/2003 | Preti et al. | |
| 6,611,815 B1 | 8/2003 | Lewis et al. | |
| 7,016,871 B1 | 3/2006 | Fisher et al. | |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,251,623 B1 * | 7/2007 | Ryan et al. | 705/35 |
| 2001/0014873 A1 | 8/2001 | Henderson et al. | |
| 2001/0047325 A1 | 11/2001 | Livingston | |
| 2002/0035527 A1 | 3/2002 | Corrin | |
| 2002/0174045 A1 | 11/2002 | Arena et al. | |
| 2003/0088430 A1 | 5/2003 | Ruark | |
| 2003/0105652 A1 | 6/2003 | Arena et al. | |
| 2003/0120570 A1 | 6/2003 | Dellinger et al. | |
| 2003/0163402 A1 | 8/2003 | Kincart | |
| 2004/0039608 A1 | 2/2004 | Mazur et al. | |
| 2004/0088236 A1 | 5/2004 | Manning | |
| 2004/0172350 A1 | 9/2004 | Atkinson et al. | |
| 2004/0181436 A1 | 9/2004 | Lange | |
| 2004/0204951 A1 | 10/2004 | Wood et al. | |
| 2004/0267647 A1 | 12/2004 | Brisbois | |
| 2005/0080698 A1 | 4/2005 | Perg et al. | |

(Continued)

OTHER PUBLICATIONS

Key to Making Retirement Savings last: The Withdrawal Rate, New York Life, www.newyorklife.com/cda/0,3254,14198,00.html. (accessed May 22, 2008).

(Continued)

*Primary Examiner* — Lalita M Hamilton
(74) *Attorney, Agent, or Firm* — Howard IP Law Group, PC

(57) ABSTRACT

A system for administering an insurance account includes a processor; a memory in communication with the processor; the processor being adapted to: access data indicative of a value of an index calculated based on a formula including as factors prices of individual equity securities; access data indicative of dividend yield; access data indicative of an asset value of an insurance account having a value based on the index; determine an updated asset value of the insurance account based on change in the index and on the dividend amount paid; store the determined updated asset value in the memory; and provide an output signal indicative of the determined updated asset value.

31 Claims, 6 Drawing Sheets

U.S. PATENT DOCUMENTS

| | | | |
|---|---|---|---|
| 2005/0144103 | A1 | 6/2005 | Perg et al. |
| 2006/0074787 | A1 | 4/2006 | Perg et al. |
| 2006/0080148 | A1 | 4/2006 | Koresko |
| 2006/0089892 | A1 | 4/2006 | Sullivan et al. |
| 2006/0143055 | A1 | 6/2006 | Loy et al. |
| 2006/0149651 | A1 | 7/2006 | Robinson |
| 2006/0190373 | A1 | 8/2006 | Perg et al. |
| 2006/0206398 | A1 | 9/2006 | Coughlin |
| 2006/0206401 | A1 | 9/2006 | Abbs et al. |
| 2006/0212379 | A1 | 9/2006 | Perg et al. |
| 2006/0212380 | A1 | 9/2006 | Williams et al. |
| 2007/0011063 | A1 | 1/2007 | Shelon et al. |
| 2007/0011069 | A1 | 1/2007 | Bevacqua, Jr. |
| 2007/0011086 | A1 | 1/2007 | Dellinger et al. |
| 2007/0021986 | A1 | 1/2007 | Cheung et al. |
| 2007/0038488 | A1 | 2/2007 | Bauer et al. |
| 2007/0078690 | A1 | 4/2007 | Kohl |
| 2007/0100715 | A1 | 5/2007 | O'Donnell et al. |
| 2007/0100720 | A1 | 5/2007 | Bonvouloir |
| 2007/0100727 | A1 | 5/2007 | Multer et al. |
| 2007/0106589 | A1 | 5/2007 | Schirripa |
| 2007/0162380 | A1 | 7/2007 | Conroy |
| 2007/0198352 | A1 | 8/2007 | Kannegiesser |
| 2007/0198377 | A1 | 8/2007 | Livingston et al. |
| 2007/0239572 | A1 | 10/2007 | Harris et al. |
| 2007/0244777 | A1 | 10/2007 | Torre et al. |
| 2007/0271201 | A1 | 11/2007 | Armand et al. |
| 2007/0278288 | A1 | 12/2007 | Simmons |
| 2008/0306878 | A1* | 12/2008 | Elam et al. .................. 705/36 R |

OTHER PUBLICATIONS

Prospectus, Penn Mutual Variable Annuity Account III, Enhanced Credit Variable Annuity; May 1, 2007.

"Glossary of Insurance Terms", Insurance Information Institute, http:www.iii.org/media/glossary (Jan. 1, 2008).

Penn Mutual Variable Annuity Account III, Sec Form 497, Filed Oct. 2, 2006.

New York Life Longevity Benefit Variable Annuity Brochure, New York Life Insurance Company, May 2007.

New York Life Longevity Benefit Variable Annuity FactSheet, New York Life Insurance Company, May 2007.

Paradis, T., More Funds Adopt Performance-Based Fees, Washingtonpost.com (Associated Press), Apr. 8, 2007.

"Facts about the New York Life Longevity Benefit Variable Annuity Product", New York Life Insurance Company, May 2007.

New York Life Longevity Benefit Variable Annuity Prospectus Amendment dated Aug. 15, 2007, New York Life Insurance Company, Aug. 2007.

S&P U.S. Indices Index Methodology, Standard & Poor's, Sep. 2007.

Blodget, H., Money for Nothing: The Real Trouble with Mutual Funds, Slate.com, Dec. 1, 2004.

"Income Select for Life"; Transamerica Financial Life Insurance Company; https://www.transamericaadvisor.com/contentServer/MediaServer? uri=/site/tciidex/media/PDF/Annuities_TCI/Client_Approved_Material/Tips_and_Techniques/BRIS.pdf.

"Jackson Enhances Living Benefit Options within its Perspective Family of Variable Annuities"; Business Wire; Apr. 30, 2007.

"Learn the Basics about Lifetime Legacy"; http://www.americo.com/lifetime/lifetimelegacy.html; Accessed Jan. 4, 2008.

"Accelerated Death Benefits"; http://www.medicare.gov/; Accessed Jan. 4, 2008.

"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.

Form N-4, Transamerica Life Insurance Company; Separate Account VA B; filed Apr. 26, 2006.

Form N-4, Transamerica Life Insurance Company; Flexible Premium Variable Annuity-J; Separate Account VA Y; filed Feb. 22, 2006.

"Fidelity.com Glossary" (letter "p"); https://scs.fidelity.com/webxpress/help/topics/help_definition_p.shtml; Accessed Jan. 4, 2008.

Stout, R.G. et al.; "Dynamic Retirement Withdrawal Planning"; Financial Services Review 15 (2006) 117-131.

"Prudential Investments Introduces Strategic Partners Annuity One; New Variable Annuity Offers Investors World-Class Money Managers and Flexible Product Features"; Business Wire, Oct. 9, 2000.

"Retireonyourterms"; http://www.retireonyourterms.com/ glossary/GlossaryText.htm; Accessed Jan. 4, 2008.

Buckingham, B.; "Making IRAs Last a Lifetime with Annuities"; Life & Health Advisor; Mar. 2006.

"RiverSource Innovations Select Variable Annuity"; http://www.riversource.com/rvsc/global/docs/INNOV-SELECT-NY-AAG.pdf.

"Pacific Life Individual (k) Program"; https://annuities.myaccount.pacificlife.com/public/corporate/product_info/pos/guide pos_1911-07b.pdf.

"Just the Facts: The Best of America All American Gold Annuity Key Facts"; Nationwide Financial Services, Inc.; https://ssc.nwseivicecenter.com/media/pdf/product/VAM-0504AO-FLpdf.

* cited by examiner

Crediting Method = Annual Point-to-Point
Participation Rate = 70%
Cap = Not applicable

| Anniversary | Account Value | Index Value | Index Growth | Participation Rate | Annual Interest Credits |
|---|---|---|---|---|---|
| 12/31/06 | 100,000 | 1200 | | | |
| 12/31/07 | 107,000 | 1320 | 10% | 70% | 7,000 |
| 12/31/08 | 108,648 | 1350 | 2.2% | 70% | 1,648 |

Prior Art
FIG. 5A

Crediting Method = Annual Point-to-Point
Participation Rate = 100%
Cap = 8%

| Anniversary | Account Value | Index Value | Index Growth | Cap Rate | Annual Interest Credits |
|---|---|---|---|---|---|
| 12/31/06 | 100,000 | 1200 | – | – | – |
| 12/31/07 | 108,000 | 1320 | 10% | 8% | 8,000 |
| 12/31/08 | 110,376 | 1350 | 2.2% | 8% | 2,376 |

Prior Art
FIG. 5B

| Anniversary | Account Value | Index Value | Index Growth | Dividend Gains | Cap Rate | Annual Interest Credits |
|---|---|---|---|---|---|---|
| 12/31/06 | 100,000 | 1200 | — | — | — | — |
| 12/31/07 | 107,000 | 1320 | 10% | 2.0% | 7% | 7,000 |
| 12/31/08 | 110,424 | 1350 | 2.2% | 1.0% | 7% | 3,424 |

FIG. 5C

SYSTEM AND METHOD FOR ADMINISTERING FIXED INDEX ANNUITIES

FIELD OF INVENTION

The present invention relates to computer systems, and particularly to computer systems for calculating features of financial products.

BACKGROUND

An annuity is a type of insurance service. In general terms, in an annuity contract, an insurance company and an annuitant contract for the annuitant to make one or more payments to the insurance company. For that consideration, the insurance company makes periodic payments to an annuitant. By way of example, the insurance company may be obliged to make a payment of a predetermined amount to the annuitant annually for a predetermined time period. In another example, the insurance company is obliged to make payments of a predetermined amount to the annuitant annually for the life of the annuitant.

Annuities may be immediate annuities, in which the stream of payments begins immediately upon purchase of the annuity contract. Annuities may also have a deferral period, in which the stream of payments only begins after expiration of the deferral period. The asset value of an annuity upon the commencement of a stream of payments generally is a significant factor in determining the amount of the payments. During the deferral period, the insurance company may credit the account with interest. An account bearing a fixed rate of interest provides predictable gains. However, over almost all periods of more than a few years since 1945, stock market indices at least in the United States have generally provided better investment returns than fixed-interest assets.

In a fixed index annuity, the asset value of an annuity account is calculated based on factors including principally changes in the value of an index calculated according to a formula made up of weighted values of selected stocks. Numerous such stock indices are available. Each index has a numerical value calculated according to a formula; in general terms, the formula for the value of the index as of a certain time and date includes as factors the prices of certain stocks at the certain time and date, weighting the prices, and summing the weighted prices. A change in an asset value of a fixed index annuity account between two dates may be based on a formula in which a percentage change in the numerical value of the index between the two dates is a factor.

SUMMARY OF THE INVENTION

In an embodiment, a system for administering a fixed-index annuity contract for the benefit of an annuitant, the asset value of the annuity being based on a formula in which the value of a stock index is a factor includes a processor and a memory in communication with the processor. The processor is adapted to access data indicative of an asset value of the annuity; access data indicative of the value of the stock index; access data indicative of a dividend yield of the stocks employed in calculation of the value of the stock index; update an asset value of the annuity based on factors including the asset value of the annuity, the value of the stock index and a factor based on weighted dividend yields of the stocks employed in the stock index; and provide an output signal including data indicative of the updated asset value.

In one embodiment, a system for administering an insurance account includes a processor; a memory in communication with the processor; the processor being adapted to: access data indicative of a value of an index, the value of the index being calculated based on a formula including as factors prices of individual equity securities; access data indicative of dividend yield of a portfolio holding the individual equity securities; access data indicative of an asset value of an insurance account having a value based on the index; determine an updated asset value of the insurance account based on change in the index and on the dividend yield; store the determined updated asset value in the memory; and provide an output signal indicative of the determined updated asset value.

In another embodiment, a computer-implemented method for administering an annuity product includes storing by a processor in a memory in communication with the processor an account asset value; accessing by a processor data indicative of a value of an index, the value of the index being calculated based on a formula including as factors prices of individual equity securities; accessing by the processor data indicative of dividend yield of a portfolio holding the individual equity securities; accessing by the processor data indicative of an asset value of an insurance account having a value based on the index; determining by the processor an updated asset value of the insurance account based on change in the index and on the dividend amount paid; storing by the processor of the determined updated asset value in the memory; and providing by the processor an output signal having data indicative of the determined updated asset value.

In an embodiment, a computer-readable medium has a instructions thereon which, when executed by a processor, cause the processor to perform the steps of: accessing data indicative of a value of an index calculated based on a formula including as factors weighted prices of individual equity securities; accessing data indicative of a dividend yield of portfolio holding the individual equity securities in proportions corresponding to the weighting in the formula; accessing data indicative of an asset value of an insurance account having a value based on the index; determining an updated asset value of the insurance account based on change in the index and on the dividend yield data; storing the determined updated asset value in the memory; and providing an output signal indicative of the determined updated asset value.

In an embodiment, a system for calculation and display of an annuity account includes a processor and a memory in communication with the processor. The processor is adapted to receive a signal having data indicative of a selection of fixed index annuity terms, including at least an index calculated based on a formula including as factors prices of individual equity securities, and investment amount; store the fixed index annuity terms and investment amount in the memory; access data indicative of exemplary index performance; access data indicative of exemplary dividend yield of the individual equity securities; access data indicative of an asset value of the fixed index annuity account based on the stored terms and investment amount; determine an updated asset value of the fixed index annuity account based on an exemplary change in the index from the data indicative of exemplary index performance and on exemplary dividend yield data; store the determined updated asset value in the memory; and provide an output signal indicative of the determined updated asset value.

A method for calculation and display of an annuity account includes receiving a signal having data indicative of a selection of fixed index annuity terms, including at least an index calculated based on a formula including as factors prices of individual equity securities, and an investment amount; storing the fixed index annuity terms and investment amount in a memory; accessing data indicative of exemplary performance of the index; accessing data indicative of exemplary dividend yield of a portfolio containing the individual equity securities; accessing data indicative of an asset value of a fixed index annuity based on the stored terms and investment amount; determining an updated asset value of the fixed index annuity based on change in the index and on the dividend amount paid; storing the determined updated asset value in the memory; and providing an output signal indicative of the determined updated asset value.

A computer-readable medium has instructions thereon, which when implemented by a processor, cause the processor to perform the steps of receiving a signal having data indicative of a selection of fixed index annuity terms, including at least an index calculated based on a formula including as factors prices of individual equity securities, and an investment amount; storing the fixed index annuity terms and investment amount in the memory; accessing data indicative of exemplary index performance; accessing data indicative of exemplary dividend yield; accessing data indicative of an asset value of a fixed index annuity based on the stored terms and investment amount; determining an updated asset value of the fixed index annuity based on change in the index and on the dividend amount paid; storing the determined updated asset value in the memory; and providing an output signal indicative of the determined updated asset value.

BRIEF DESCRIPTION OF THE DRAWINGS

FIGS. 5A and 5B are tables illustrating prior art methods.

FIG. 5C is a table illustrating a method according to an implementation of the invention.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems, and methods for administration of insurance products such as annuities. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
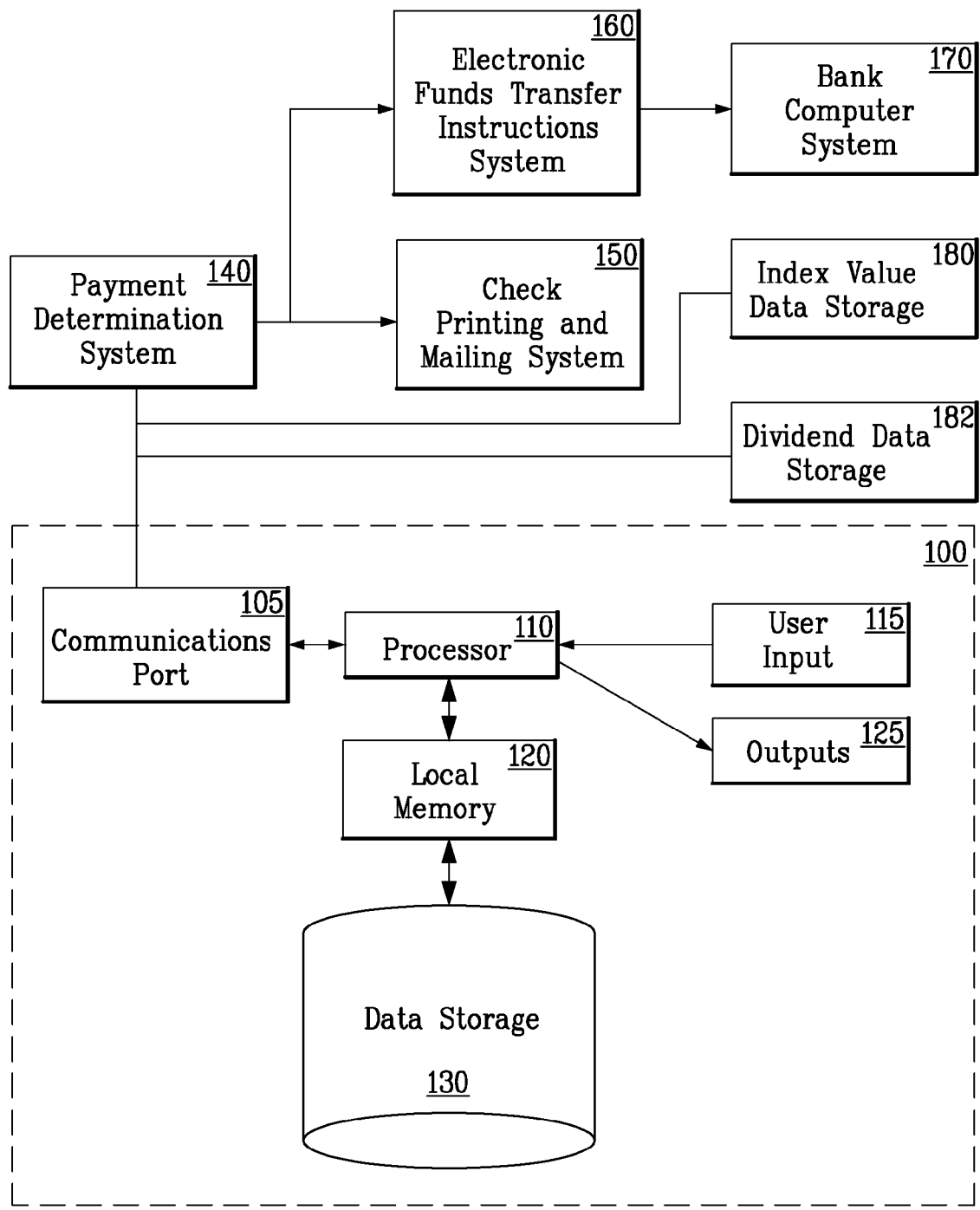
FIG. 1 is a schematic diagram of an exemplary computer system for implementation of a method and system of the invention.

Referring to FIG. 1, an exemplary computer system for use in the implementation of the invention will now be described. In computer system 100, processor 110 executes instructions contained in programs stored on recorded media. Processor 110 communicates, such as through suitable buses and other data channels, with communications port 105 and local memory 110, receives data from user inputs 115, and provides data to outputs 125. Local memory 120 is configured to exchange data with processor 110, and may store programs containing processor-executable instructions, and values of variables for use by such programs. Data storage 130 may include a wide variety of data acquired and processed in accordance with the invention. User input may be provided at inputs 115, which may include keyboards, mice and touchscreens. Outputs 125 may include displays and printers. Communications port 105 communicates with remote sources of information. Communication may be by one or more of suitable communication methods, including over wired or wireless local area networks and wide area networks, and over communications between networks, including over the Internet. Any suitable data and communication protocols may be employed.

A challenge that has been recognized by the inventors is that fixed index annuities based on the value of a stock index or other equity security index track the index value, but do not track the value of ownership of the equity securities making up the index. The asset value of a fixed index annuity account does not indicate ownership by the annuitant of the underlying stocks or shares in a fund that owns the underlying stocks. Rather, the asset value is simply calculated based on the numerical value of the index. It will be appreciated that an index has a numerical value calculated from a formula which includes as factors the prices of certain securities. However, an index does not own securities.

Ownership of equity securities carries with it a right to receipt of dividends payable on the equity securities. The effect of dividend yield on the overall returns attributable to ownership of equity securities results in a greater return than the return attributable to increases in index value alone. Unlike a fixed-index annuity, an index fund, such as an index mutual fund or an exchange-traded fund, has as its investment objective ownership of the equity securities used for calculation of the index. The fund owns, or has as its objective to own, those securities in the same proportion as reflected in the weighting of the securities pricing in calculating the index value. As the index fund owns the underlying securities, the index fund, and thus the fund shareholders, participate in the dividend yield. By contrast, the beneficiary of a fixed index annuity does not participate in dividend yield. Accordingly, a fixed index annuity having a net asset value based on the value of an index calculated from prices of equity securities may appear less desirable than an index fund that owns those same securities.

Figure 3:
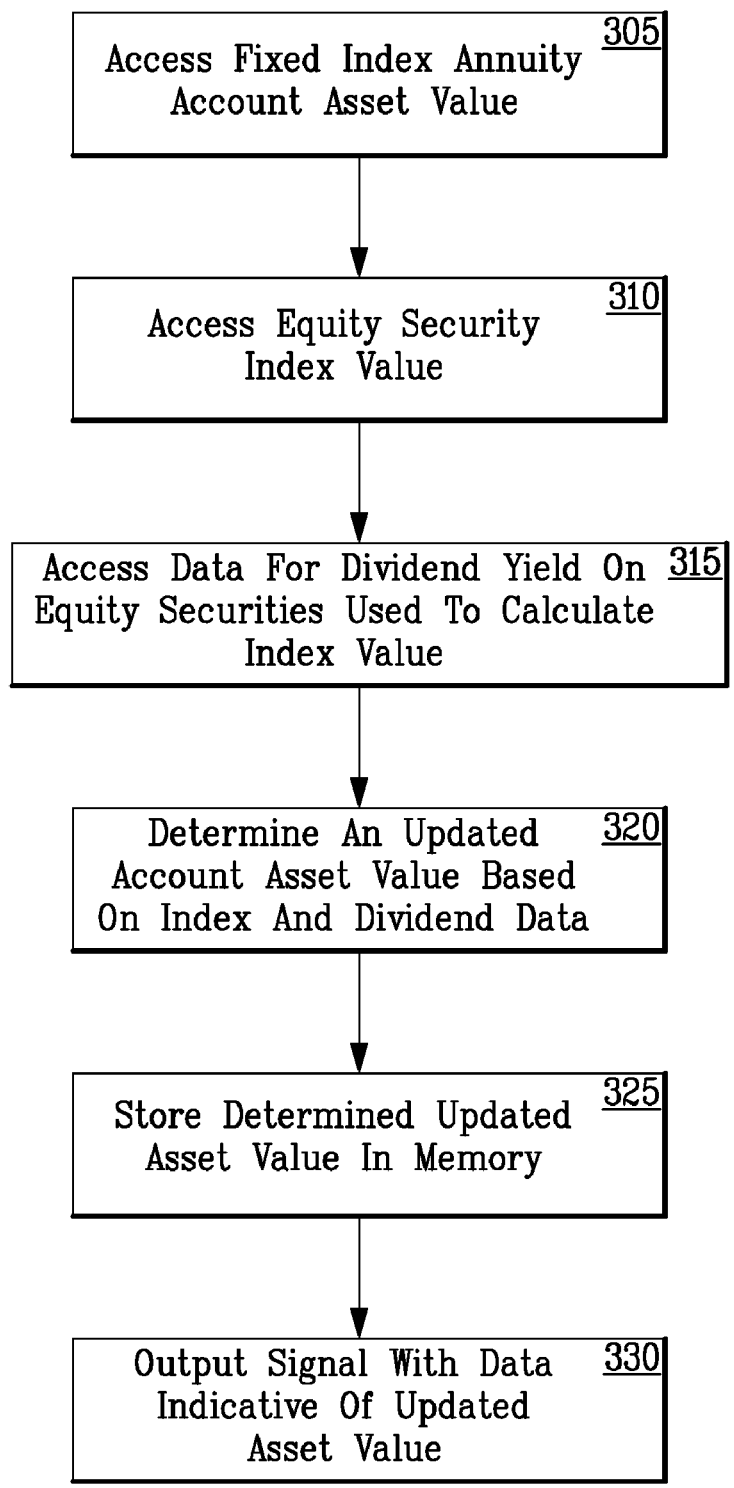
FIG. 3 is a process flow diagram illustrating a method for administering annuities implemented by the computer system of FIG. 1.

Referring now to FIG. 3, a high level process flow of a method for administering an annuity product will be explained, with reference to the computer system of FIG. 1. In accordance with an implementation, an insurance company and a user, who may be the annuitant, have entered into an insurance contract for funding of an annuity. The contract involves the payment to the insurance company of a premium to establish an asset value. In the present implementation, the annuity is a fixed index annuity. In a fixed index annuity, the asset value is adjusted periodically to reflect changes in the value of an index. In this implementation, the index has a numerical value calculated based on factors including prices of selected equity securities, and various weighting factors. At least one of the equity securities pays dividends regularly, although this dividend payment is not relevant to the index. In an implementation, the index may be a commercially-available index, such as one of the indices provided by Standard & Poor's, which include, by way of example, S&P 500, S&P 500 Dividend Aristocrats, S&P Equal Weight Index, S&P 500 O-Strip, S&P MidCap 400, S&P SmallCap 600, S&P Composite 1500, S&P High Yield Dividend Aristocrats, S&P 1000, S&P 900, S&P 100, S&P Select Industry Indices, S&P Completion Index, S&P Total Market Index, S&P North American Sector Indices and S&P North American Technology Indices, among U.S. equity indices. Of course, indices made up of or including equities traded and issued in markets other than the United States are also included within the term index.

The method of updating the asset value of the annuity account may include a known method, such as any one of annual reset point-to-point, monthly averaging, monthly point-to-point, and high watermark. Other methods, including later-developed methods, may also be employed.

Referring now to FIG. 3, in an implementation, a processor, such as processor 110 of FIG. 1, accesses data indicative of asset value of an annuity account 305. The processor may then access date indicative of the value of an index 310, such as an equity security index, such as a stock index. This data may include values of the index on one or more dates. For example, if the method of crediting the annuity is an annual reset point-to-point method, then the values of the index at close of the market on the same date in the prior year and the current year may be accessed. If the method is monthly point-to-point, then the values of the index at close of the market the same date in the current month and the prior month may be accessed. Such data may be stored in a digital memory, such as memory 180 of FIG. 1. The processor may access data indicative of dividend yield for the securities 315. For example if the method of crediting the annuity is an annual reset point-to-point method, the data indicative of dividend yield may include data indicative of all dividends paid with an ex-date in the year period. This data may be stored in a memory, such as memory 182 of FIG. 1.

It will be appreciated that in an implementation, the steps of accessing index value and accessing dividend yield data may be combined by accessing the value of a total return index. A total return securities index is a number calculated based on a formula incorporating weighted prices of selected equity securities. However, unlike a stock index, a total return securities index calculates the index value using the assumption that all dividends and distributions on the equities that are reinvested in the equities making up the index.

The processor may access data indicative of an asset value of an insurance account having a value based on the index 315. For example, the data may be an asset value of a fixed index account on the date of a prior asset value update. In an account in which the annuity is credited using the annual reset point-to-point method, the date may be one year prior. The processor may then determine an updated asset value of the insurance account based on change in the index and on dividend yield data 320. The dividend yield may be a dividend yield that is an estimated dividend yield for a portfolio holding the individual equity securities used in calculating the index. In an implementation, a dividend yield amount may be determined by accessing dividend data for each equity security used in calculating the index and weighting the dividend amount in the same manner as the corresponding security is weighted in calculating the index. In such an implementation, the dividend yield may be exactly the same or very close to the dividend yield of a corresponding index fund. In an implementation, a dividend yield may be determined based on a total return index corresponding to the index. In an implementation, a dividend yield may be based on average, median, or other benchmark dividend data. For example, if a stock index is based on a certain market segment, the dividend yield may be based on average dividend data for that market segment for the relevant time period. Such a calculation results in an estimated dividend yield for a portfolio holding the same equity securities, such as an index fund.

The processor may then store the determined updated asset value in the memory 325. The processor may then provide an output signal indicative of the determined updated asset value 330.

In an implementation, the processor determines the updated asset value based on the sum of percentage change in the index value and the dividend amount as a percentage of securities value multiplied by a participation rate not greater than 1. The participation rate is specified in the contract between the annuitant and the insurance company. In an implementation, the participation rate may be 1, or 100%, so that the full calculated amount is credited. In an implementation, the participation rate may be 80%, so that only 80% of the calculated change is credited to the account. In an implementation, the participation rate may be greater than 100%, such as 120%. These participation rates are merely exemplary, and participation rates are determined by the annuity contract.

In an implementation, the processor may determine the updated asset value by comparing the sum of the percentage increase in the index value and the dividend amount as a percentage of securities value to a cap. The asset value may then be updated by not more than the cap. By way of example, the cap may be expressed as a percentage of asset value over a certain time period. By way of example, the time period may be a month or a year. For example, the cap may be not more than a 2 percent change in a month, or a not more than 8 percent change in a year. Various fees, generally referred to as a spread, and also referred to as a margin or as administrative fees, may also be factors in calculated the updated account value.

After the output signal is provided, various steps may take place. For example, the output signal may be provided to a report fulfillment processor, which may store the amount, access a database having other data pertinent to the annuitant, including name, address, account numbers, account names, historical performance, and other information, and direct a printer to print out a report for an annuitant indicating the amount of the change in asset value, along with other information. The report may then be prepared for mailing and mailed via postal mail. In another embodiment, the report may be printed as an image, such as a portable data format (pdf) image, stored in memory, and transmitted via e-mail to an address stored in a database and associated with the annuitant.

In an embodiment, the updating of asset value may have been triggered in response to a direction for a disbursement. In this embodiment, referring to FIG. 1, communications port 105 may communicate with payment determination system 140. Payment determination system 140 may include one or more computer systems, including processors, memory devices, user inputs, outputs, software executed by the processors, and other conventional components. Payment determination system 140 may be adapted to receive an output signal via communications port 105, which output signal includes an updated account value to be paid and information identifying an annuitant. Payment determination system 140 may further be adapted to determine a payor account and a payment method. The payor account may be an account with a selected bank; by way of example, payment determination system 140 may include a look-up table mapping annuitant information, such as geographic information, to a particular bank and account. Payment determination system 140 may also include information, stored in memory and accessible by a processor, indicating whether a particular annuitant is to be paid by paper check, by electronic funds transfer, or in some other manner. A processor of payment determination system 140 may cause to be stored in memory of the payment determination system the determined payor account information and the determined payment method. The processor of payment determination system 140 may cause a digital signal to be output indicative of the stored payor account information, the stored payment method, amount information and payee information.

In an embodiment, the output digital signal may be received by check printing and mailing system 150. Check printing and mailing system 150 may include one or more computer systems, including processors, memory devices, user inputs, outputs, software executed by the processors, and other conventional components. The outputs include in particular one or more printers, and may include other devices useful in printing and mailing paper checks, such as devices for feeding paper, separating printed checks, inserting printed checks into envelopes, sealing envelopes, and applying postage to envelopes as appropriate. The printed check is then mailed to the annuitant. The annuitant deposits the check in the annuitant's bank account, causing funds to be credited to the annuitant's bank account, and causing the funds to be withdrawn from the designated bank account from which the payment is made.

In an embodiment, the output digital signal from payment determination system 140 may be received by electronic funds transfer instructions system 160. Electronic funds transfer instructions system 160 may include one or more computer systems, including processors, memory devices, user inputs, outputs, software executed by the processors, and other conventional components. Electronic funds transfer instructions system 160 includes a processor adapted to provide an output signal indicative of an instruction to a bank determined by the payor account information to provide an electronic funds transfer from the payor account to a payee account in an amount as previously determined, such as by processor 110.

The output signal from electronic funds transfer instructions system 160 may be provided to a bank computer system 170, which carries out an electronic funds transfer, debiting the designated account, and resulting in a credit to a designated annuitant account.

Figure 2:
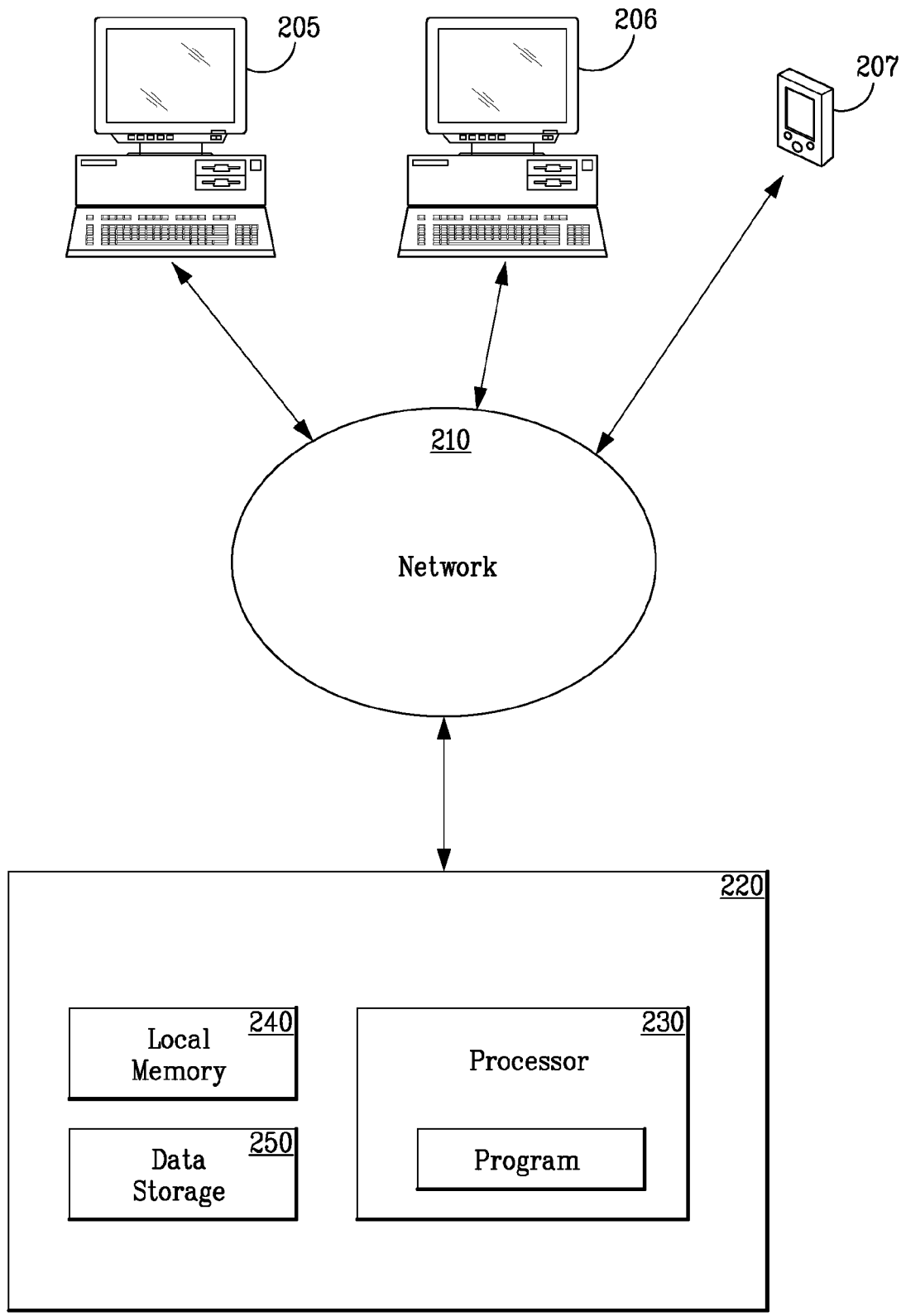
FIG. 2 is a schematic diagram of an exemplary network system for implementation of a method and system of the invention.
Figure 4:
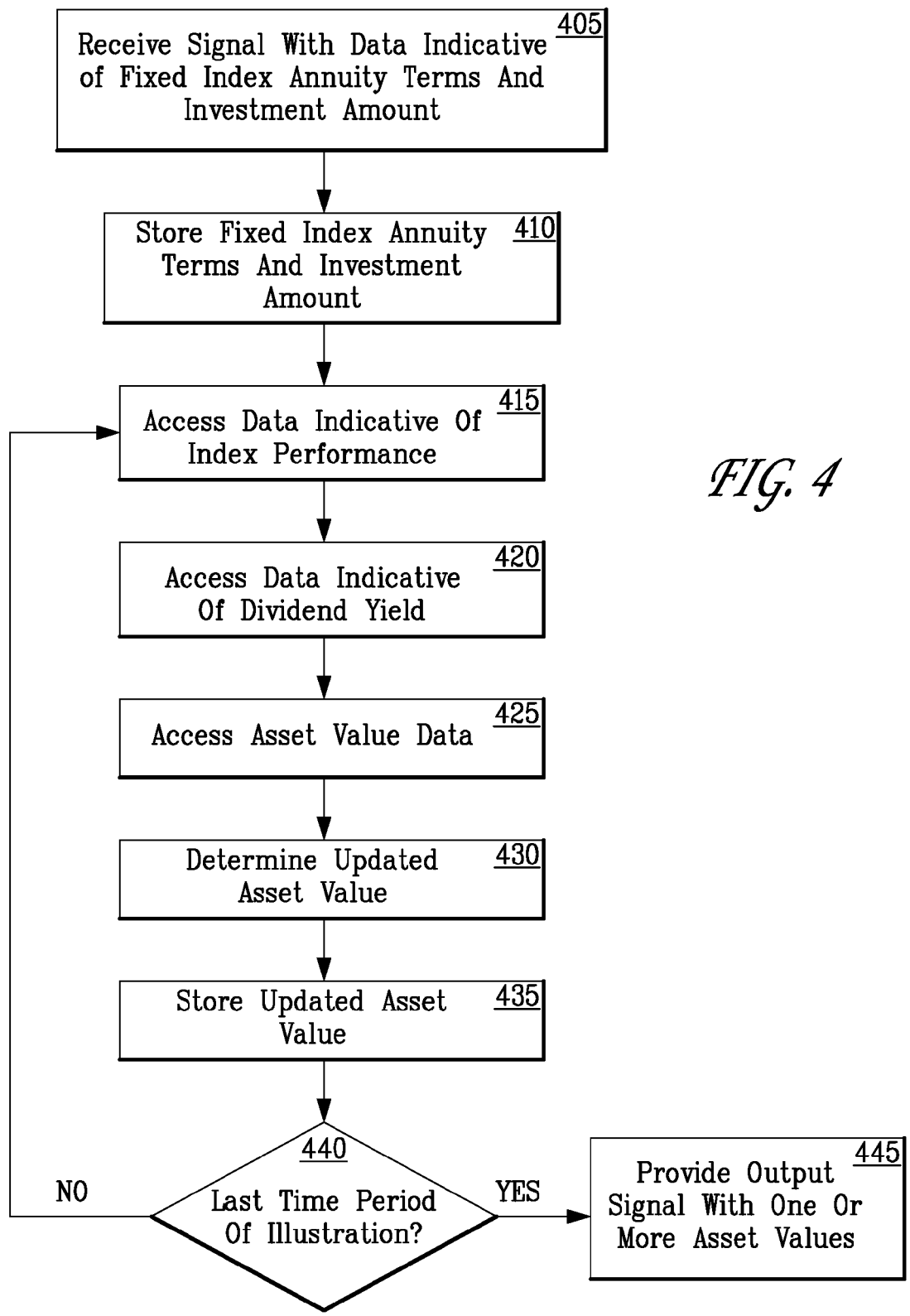
FIG. 4 is a process flow diagram illustrating a method for providing an illustration of an annuity account implemented by the computer system of FIG. 2.

In an implementation, a system and method are provided for providing illustrations or examples of annuities, based on hypothetical assumptions. A client-server system may be implemented, such as a browser based system, in which a client running a web browser communicates with a web server over a network, such as a LAN, a WAN, a corporate intranet, or the Internet, or a combination of two or more networks. Referring to FIG. 2 and FIG. 4, processor 230 may receive a signal having data indicative of a selection of fixed index annuity terms, including at least an index, the value of which is calculated from a formula incorporating weighted prices of selected equity securities, and investment amount 405. The signal may be provided in response to a user filling out a form, such as an xml based form, offering various options for selection of an index, terms, and investment amount. Processor 230 may store 410 the fixed index annuity terms and investment amount in memory, such as local memory 240. Processor 230 may access data indicative of exemplary index performance. Such data may be stored in data storage 250, by way of example. The data indicative of exemplary index performance may include, by way of example, average historical performance of an index over one or more selected periods of years. By way of further example, the data may include a statistical selection other than an average, such as a mean or median, from historical performance over one or more selected periods of years. The data may include historical performance of indices having similar holdings, by way of further example.

The processor may access 420 data indicative of exemplary dividend yield of the equity securities whose prices are incorporated in the calculation of the index value. The data may include historical data related to dividend yield on the individual equity securities. It will be appreciated that, depending on the selected index, all or only some of the equity securities may pay dividends. The data may include average or other statistical measures of historical dividend yields. The data may include benchmark dividend yields, such as average equity dividend yields for selected stocks, e.g., large cap U.S. stocks or small cap U.S. stocks.

It will be appreciated that stored data indicative of exemplary performance of a total return index, if available, may be accessed.

The processor may then access 425 data indicative of an asset value of an illustrative fixed index annuity. For example, in providing an illustration of investment performance in a first time period, such as a year, from inception of the account, the asset value may be based on the investment amount and any charges, which will be based on the stored terms. For later time periods, the investment amount may be based on a previously calculated asset value and any charges based on the stored terms.

The processor may then determine 430 an updated asset value of the illustrative fixed index annuity. The change in asset value is based at least on the exemplary change in the index and on the exemplary dividend yield. A change in asset value may also be based on other terms, such as a participation rate and a cap, by way of example.

The processor may then store 435 the determined updated asset value in memory. The processor may then determine 440 whether the update for the final time period for the illustration or example of the hypothetical annuity has been performed. If the update for the final time period has not been performed, then the process flow may return to accessing index performance data. If the update has been performed, then an output signal may be provided 445 indicative of the determined updated asset value.

The output signal may include instructions to provide a page illustrating performance to one of client devices 205, 206, 207. The processor may prepare the calculated updated asset values to be displayed in tabular form on the page on the display. The processor may prepare the values by accessing a form from a memory device, and inserting the updated asset values in suitable locations in the form. The page is then displayed for a user, who may be a prospective annuitant, broker, or other financial advisor for an annuitant or a prospective annuitant. An exemplary table, which may be incorporated on a page of a display, is shown in FIG. 5C, which is discussed in detail below. In another implementation, the output signal may be transmitted to a printer for printing of an illustration of performance. In an implementation, the output signal may be provided to a print driver for a portable data format document, or an image format such as TIFF or JPEG.

In an implementation, processor 230 may cause a web page to be presented to a user on one of client devices 205, 206, 207, or may cause a form of annuity contract consistent with the terms selected by the annuitant to be printed.

Referring now to FIG. 5A, a prior art illustration 505 is shown. The prior art illustration assumes an account value 507 of 100,000 on Dec. 31, 2006, in a fixed index annuity of the prior art based on an equity fund index. In the example, the values do not represent a particular real index. The index value, from column 510, as of Dec. 31, 2006 was 1200. The asset value was recalculated for Dec. 31, 2007. The index value was accessed, and found to be 1320. The index had therefore increased by 10%, as shown in column 512. The participation rate is 70%, so that 70% of the increase is credited to the account. Thus, an increase of 7% is credited to the account, resulting in a new account value of $107,000.

The value is then recalculated for Dec. 31, 2008, based on an estimated index performance. The estimated index price as of Dec. 31, 2008 is 1350, for a growth of 2.2% over the previous year. An increase of $1648 is credited to the account, based on the account value of $107,000, the growth rate of 2.2%, and the participation rate of 70%.

Another prior art method is illustrated in FIG. 5B. In this method, a fixed index annuity is also commenced with an account value of $100,000 as of Dec. 31, 2006. The participation rate is 100%, and a cap of 8% gain in any one year period is applicable. Thus, the first year's gain of 10% results in a credit of 8% to the account, in view of the cap. The second year's gain of 2.2% results in a credit of 2.2% to the account.

Referring now to FIG. 5C, an exemplary implementation of a system and method of the invention is illustrated. The process flow of the above figures is repeated, but for an account having a cap rate of 7%, and a participation rate of 100%. In addition, the dividend yield is considered. The first year's gains include both a 10% increase in the index value, and dividend yield of 2%. The 2% dividend yield may be calculated based on an applicable benchmark, or by determining the dividend yield of each stock on which the index is based, and weighting the dividend yield consistent with the weighting of the stocks in calculating the index value. Thus, the first year's credit to the account is 7%, in view of the cap. In the second year, the index gain of 2.2% is much lower than the prior year, but the dividend performance is 1.0%. Again, the dividend yield may be based on a benchmark, or determined by weighting the dividend yield of the stocks according to the weighting of the dividend-paying stocks in calculating the index value, for example. Thus, the total credit to the account is 3.2%. In this example, the gain in account value in the example of FIG. 5C exceeds the gain in account value in both of the prior art examples.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by processor 110 executing instructions contained in programs which may be stored in a storage medium, such as local memory 120 or data storage 130. It will be appreciated that any of the steps in the methods in accordance with the invention described herein may be so implemented.

While the foregoing invention has been described with reference to the above embodiments, various modifications and changes can be made without departing from the spirit of the invention. Accordingly, all such modifications and changes are considered to be within the scope of the appended claims.

What is claimed is:

1. A system for administering a fixed-index annuity contract for the benefit of an annuitant, the asset value of the annuity being based on a value of a stock index employing weighted values of a plurality of stocks, comprising:
 a processor;
 a memory in communication with the processor;
 the processor being configured to:
 access data indicative of an asset value of the annuity;
 access data indicative of the value of the stock index;
 access data indicative of a dividend yield of the stocks employed in calculation of the value of the stock index;
 update an asset value of the annuity based on factors including the asset value of the annuity, the value of the stock index and a factor based on weighted dividend yields of the stocks employed in the stock index; and
 provide an output signal including data indicative of the updated asset value.

2. The system of claim 1, wherein the factors further include a participation rate, a spread and a cap.

3. The system of claim 1, further comprising a second processor for receiving the output signal and causing a printer to print a report for the annuitant including the updated asset value of the annuity.

4. A system for administering an insurance account, comprising:
 a processor;
 a memory in communication with the processor;
 the processor being configured to:
 access data indicative of a value of an index, the value of the index being calculated based on prices of individual equity securities;
 access data indicative of dividend yield of a portfolio holding the individual equity securities;
 access data indicative of an asset value of an insurance account having a value based on the index;
 determine an updated asset value of the insurance account based on change in the index and on the dividend yield;
 store the determined updated asset value in the memory; and provide an output signal indicative of the determined updated asset value.

5. The system of claim 4, wherein the insurance account is a fixed index account.

6. The system of claim 4, wherein the index is a stock index.

7. The system of claim 4, wherein the processor is adapted to determine the updated asset value based on a sum of percentage increase in the index value and the dividend yield as a percentage of securities value multiplied by a participation rate.

8. The system of claim 4, wherein the processor is adapted to determine the updated asset value by comparing a sum of the percentage increase in the index value and the dividend yield as a percentage of securities value to a cap, and updating the asset value, the updating increasing the asset value by not more than the cap.

9. The system of claim 4, wherein the dividend yield is based on the dividend yield of a corresponding index fund.

10. The system of claim 4, wherein the dividend yield is based on a benchmark dividend yield.

11. The system of claim 4, further comprising: a payment determination system having a processor for: receiving the output signal, determining of a payor account and a payment method; storing of the determined payor account information and the determined payment method in a memory of the payment determination system; outputting of a digital signal indicative of the stored payor account information, the stored payment method, amount information and payee information; and a payment fulfillment system for receiving the digital signal from the payment determination system and for fulfillment of payment in accordance with the information conveyed by the digital signal from the processor of the payment determination system.

12. A computer-implemented method for administering an annuity product, comprising the steps of:

storing by a processor in a memory in communication with the processor an account asset value;

accessing by the processor data indicative of a value of an index having weighted shares of individual equity securities;

accessing by the processor data indicative of dividend yield of a portfolio holding the individual equity securities;

accessing by the processor data indicative of an asset value of an insurance account having a value based on the index;

determining by the processor an updated asset value of the insurance account based on change in the index and on the dividend yield;

storing by the processor of the determined updated asset value in the memory; and providing by the processor an output signal having data indicative of the determined updated asset value.

13. The method of claim 12, wherein the insurance account is a fixed index account.

14. The method of claim 12, wherein the index is a stock index.

15. The method of claim 12, wherein the updated asset value is determined by the processor based on the sum of percentage increase in the index value and the dividend yield as a percentage of securities value multiplied by a participation rate.

16. The method of claim 12, wherein the step of determining the updated asset value by the processor comprises comparing the sum of the percentage increase in the index value and the dividend yield as a percentage of securities value to a cap, and updating the asset value, the updating increasing the asset value by not more than the cap.

17. The method of claim 12, wherein the dividend yield is based on the dividend yield of a corresponding index fund.

18. The method of claim 12, wherein the dividend yield is based on a benchmark dividend yield.

19. A non-transitory computer-readable medium having a plurality of instructions thereon which, when executed by a processor, cause the processor to perform the steps of:

accessing data indicative of a value of an index calculated based on weighted prices of individual equity securities;

accessing data indicative of a dividend yield of a portfolio holding the individual equity securities in proportions corresponding to weighting of the weighted prices;

accessing data indicative of an asset value of an insurance account having a value based on the index;

determining an updated asset value of the insurance account based on change in the index and on the dividend yield data;

storing the determined updated asset value in a memory; and providing an output signal indicative of the determined updated asset value.

20. The computer-readable medium of claim 19, wherein the output signal is provided to a printer driver to cause a printer to print the determined updated asset value.

21. The computer-readable medium of claim 19, wherein the output signal is provided to a video driver to cause a display to display the determined updated asset value.

22. A system for calculation and display of an annuity account, comprising:

a processor; and a memory in communication with the processor;

wherein the processor is configured to:

receive a signal having data indicative of a selection of fixed index annuity terms, including at least an index calculated based on prices of individual equity securities, and investment amount;

store the fixed index annuity terms and investment amount in the memory;

access data indicative of exemplary index performance;

access data indicative of exemplary dividend yield of the individual equity securities;

access data indicative of an asset value of the fixed index annuity account based on the stored terms and investment amount;

determine an updated asset value of the fixed index annuity account based on an exemplary change in the index from the data indicative of exemplary index performance and on exemplary dividend yield data;

store the determined updated asset value in the memory; and provide an output signal indicative of the determined updated asset value.

23. The system of claim 22, further comprising a user-accessible device having a user input and a display, wherein the signal having data indicative of a selection of fixed index annuity terms, is received by the processor from the user input.

24. The system of claim 23, wherein the output signal is received by the user-accessible device and displayed on the display.

25. The system of claim 23, wherein the processor is further configured to:

(a) repeat the steps of:

accessing data indicative of exemplary index performance;

accessing data indicative of exemplary dividend yield;

accessing data indicative of an asset value of an illustrative fixed index annuity based on the stored terms and investment amount;

determining an updated asset value of the illustrative fixed index annuity based on change in the index and on the dividend amount paid; and storing the determined updated asset value in the memory; and (b) prepare the updated asset values to be displayed in tabular form on the display.

26. A method for calculation and display of an annuity account, comprising:

receiving by a processor a signal having data indicative of a selection of fixed index annuity terms, including at least an index calculated based on prices of individual equity securities, and an investment amount;

storing by the processor the fixed index annuity terms and investment amount in a memory;

accessing by the processor data indicative of exemplary index performance;

accessing by the processor data indicative of dividend yield of the individual equity securities;

accessing by the processor data indicative of an asset value of a fixed index annuity account based on the stored terms and investment amount;

determining by the processor an updated asset value of the fixed index annuity account based on an exemplary change in the index from the data indicative of exemplary index performance and on exemplary dividend yield data;

storing by the processor the determined updated asset value in the memory; and providing by the processor an output signal indicative of the determined updated asset value.

27. The method of claim 26, wherein the signal having data indicative of a selection of fixed index annuity terms, including at least an index, and investment amount is received by the processor from a client-accessible device displaying a user-fillable form.

28. The method of claim 26, wherein the output signal further comprises instructions for printing of an illustration including the determined updated asset value.

29. A non-transitory computer-readable medium having a plurality of instructions thereon, which when implemented by a processor, cause the processor to perform the steps of:

receiving a signal having data indicative of a selection of fixed index annuity terms, including at least an index calculated based on prices of individual equity securities, and an investment amount;

storing the fixed index annuity terms and investment amount in a memory;

accessing data indicative of exemplary index performance;

accessing data indicative of dividend yield of a portfolio containing the individual equity securities;

accessing data indicative of an asset value of a fixed index annuity based on the stored fixed index annuity terms and investment amount;

determining an updated asset value of the fixed index annuity based on change in the index and on the dividend yield data;

storing the determined updated asset value in the memory; and providing an output signal indicative of the determined updated asset value.

30. The computer readable medium of claim 29, wherein the instructions cause the processor to perform the further steps of accessing data indicative of a total return of the index.

31. The computer readable medium of claim 29, wherein the output signal includes instruction for printing a document including the determined updated asset value.

* * * * *